April 2, 1957   H. F. ORMEROD   2,787,653
ELECTRIC CABLES
Filed Feb. 24, 1953
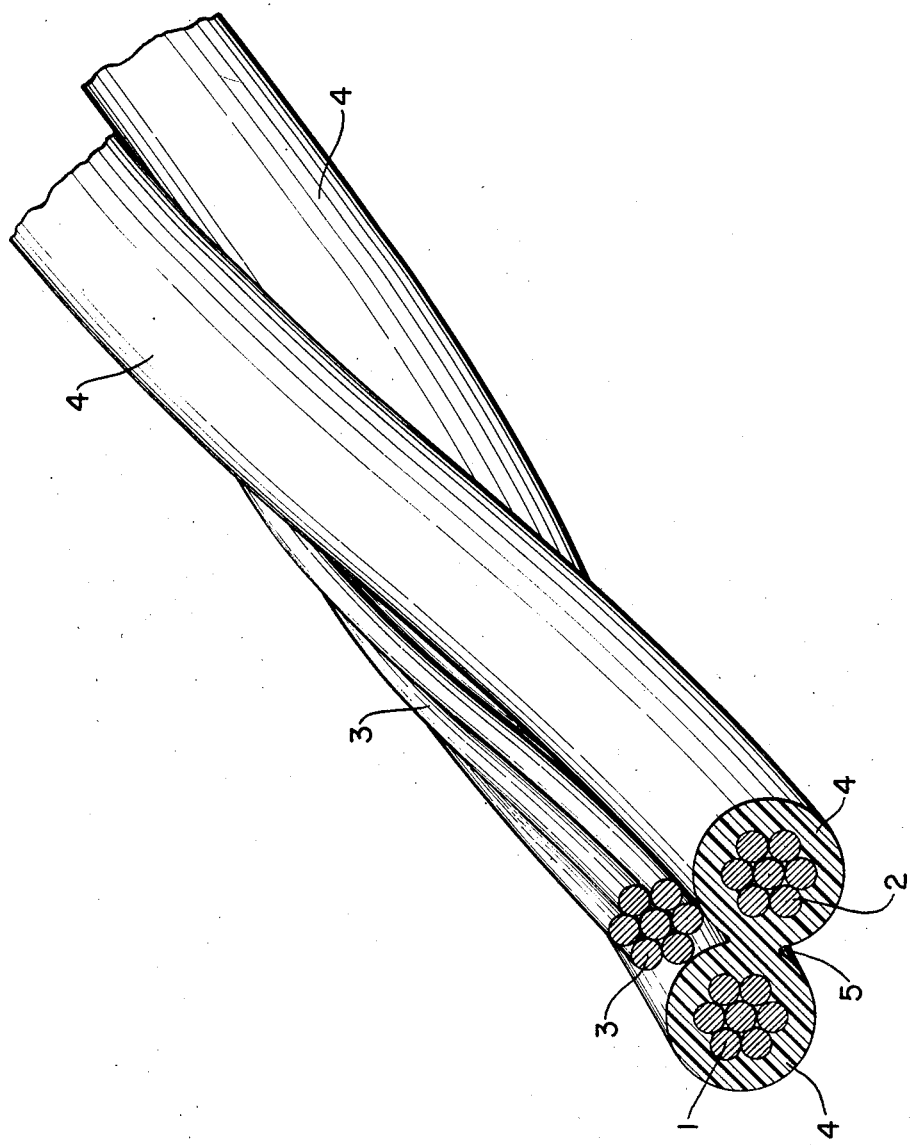
INVENTOR
Harold F. Ormerod
BY
ATTORNEYS

United States Patent Office 2,787,653
Patented Apr. 2, 1957

2,787,653

ELECTRIC CABLES

Harold F. Ormerod, Yonkers, N. Y., assignor to Anaconda Wire and Cable Company, a corporation of Delaware Application February 24, 1953, Serial No. 338,357

2 Claims. (Cl. 174—117)

This invention relates to electric cables, and has for its principal object to provide a simply made and inexpensive three-conductor cable of improved mechanical properties, and a method of making such cable. According to the invention, the cable comprises at least two insulated conductors, and a third conductor which may be insulated or bare, as desired. Each conductor of the insulated pair is directly surrounded by a substantially cylindrical layer of insulation, and the two insulating layers are integrally united throughout their length. The united insulated conductors are spirally wrapped with the third conductor to form a three-conductor cable. In the resulting cable the positioning relative to each other and to the third conductor of the conductors having the integrally joined layers of insulation is maintained uniform throughout the length of the cable, and unequal tensile stresses on the individual conductors, when the cable is aerially suspended, is avoided.

Three-conductor twisted cables are very commonly used in low frequency power circuits, such as 60-cycle, 110 volt or 220 volt wiring. A typical example of such application is a service entrance cable which extends from a three-wire aerial distribution line to an individual power user. For convenience in wiring, it is common practice to spirally wrap or twist the three conductors of the cable together. However, difficulty is encountered in the wrapping or twisting operation because of a tendency of the conductors to separate from each other, or to wander somewhat in position relative to each other throughout the length of the cable. As a result the twisting or wrapping operation is made more difficult to perform, and in the finished cable it is possible for unequal tensile stresses to be imposed on the individual conductors, at various positions along the length of the cable, when it is aerially suspended under tension.

In the cable of the present invention at least two insulated conductors are integrally joined together throughout their length, and cannot separate when they are spirally wrapped with the third conductor. The integral joining of the insulated conductors may be effected by extruding a conventional plastic insulating material (e. g. rubber, polyvinyl chloride, polyethylene, etc.) substantially in the form of a figure 8 simultaneously about both conductors of the pair, so that each conductor is surrounded by a substantially cylindrical layer of the insulating material and such layers are integrally united. Alternatively, the two conductors may be insulated separately, and may then be brought into contact with each other while the insulation is still soft and adhesive, so that the two layers of insulation adhere to each other and become integrally united.

When the united insulated conductors are spirally wrapped with a third conductor to provide the preformed cable, the wrapping operation may be carried out more rapidly and with less close attention to its progress than when three separate wires are thus assembled together. Moreover, in the finished cable the positioning of the several relatively stiff conductors relative to each other is maintained remarkably uniform throughout the length of the cable, with the result that the cable may be aerially suspended without imposing significantly unequal tensile strains on the conductors at any position along its length.

The accompanying drawing shows a three-conductor cable made in accordance with the present invention.

The illustrated form of cable comprises a pair of stranded conductors 1 and 2, and a third stranded conductor 3, shown as uninsulated. Each of the pair of conductors 1 and 2 is surrounded by a substantially cylindrical layer 4 of insulation, the two layers being integrally united as shown at 5. The thus insulated conductors are spirally wrapped together with the third (bare) conductor 3 to form the cable.

The insulated conductors 1 and 2 have a twisted form as they are shown in the cable of the drawing, which form results from the operation of spirally wrapping them together with the third conductor 3. Advantageously, however, when the insulation layers 4 are applied, the conductors 1 and 2 are held in flat parallel relation, rather than being twisted together. The insulated conductors should have a flat parallel configuration when they are spirally wrapped with the third conductor in order to simplify the wrapping operation and to assure that the positioning of the conductors relative to each other is maintained uniform throughout the length of the cable.

The three conductors are illustrated as made of stranded wire. However, it is understood that the construction of the conductors is dictated by their size and the degree of flexibilty required in the finished cable, and they may be either stranded or solid. In the drawing, the third conductor 3 is shown as bare (uninsulated) but if desired it may be insulated.

The cable construction of the invention may be employed with particular advantage when the conductors are aluminum. The rather low tensile strength of aluminum makes it important to minimize the tensile strain to which each conductor of an aluminum aerial cable is subjected. The uniformity with which the positioning relative to each other of the conductors of the new cable is maintained assures that the strain on each conductor will be substantially the same as on each other conductor at all points along the length of the cable when it is suspended under tension between aerial supports. Hence an aluminum service entrance cable constructed as herein described may be suspended between quite widely separated aerial supports without requiring either a steel tensile reinforcing element embodied in its structure or a messenger wire to carry it.

I claim:

1. A preformed electric cable of the character described comprising three relatively stiff metallic conductors helically wrapped together, each of two of said conductors being surrounded by a substantially cylindrical layer of insulating material, the third of said metallic conductors being bare, the cylindrical insulation of one insulated conductor being integrally united to the adjoining cylindrical insulation of the other insulated conductor, said bare conductor lying adjacent to both of said insulated conductors throughout the length of the cable, and each of said three conductors extending the length of said cable in helical paths of substantially equal and uniform pitch and radius, whereby tensile stresses in each are equalized during aerial suspension of said cable.

2. A preformed electric cable of the character described adapted for high tension aerial suspension between widely spaced supports comprising three relatively stiff metallic conductors twisted together throughout the length of said cable, each of said conductors being of substantially the same size and extending in helical paths of substantially equal and uniform pitch and radius so that each carries a substantially equal share of the total tensile load when the cable is suspended aerially, one of said twisted conductors being bare, each of the two remaining twisted conductors being surrounded by a substantially cylindrical layer of insulating material, said cylindrical layers of insulating material being integrally united in intimate side-by-side relation throughout the length of said cable, and said bare twisted conducter lying adjacent to both of said insulated twisted conductors in continuous contact with each throughout the length of said cable.

References Cited in the file of this patent

UNITED STATES PATENTS

| | | |
|---|---|---|
| 1,984,038 | Shaw et al. | Dec. 11, 1934 |
| 2,081,634 | McNamee | May 25, 1937 |
| 2,403,815 | Martin | July 9, 1946 |
| 2,434,793 | Feaster | Jan. 20, 1948 |
| 2,473,965 | Morrison et al. | June 21, 1949 |
| 2,538,019 | Lee | Jan. 16, 1951 |

FOREIGN PATENTS

| | | |
|---|---|---|
| 300,826 | Australia | Nov. 22, 1928 |

OTHER REFERENCES

Electrical World, page 152, July 16, 1951.
Electrical World, page 66, April 7, 1952.